United States Patent
Singer et al.

(10) Patent No.: US 7,423,529 B2
(45) Date of Patent: Sep. 9, 2008

(54) SYSTEMS AND METHODS FOR MOBILE SECURITY AND MONITORING

(75) Inventors: Brian Singer, Denver, CO (US); Kevin Jones, Miami, FL (US)

(73) Assignee: OBS, Inc., Denver, CO (US)

( * ) Notice: Subject to any disclaimer, the term of this patent is extended or adjusted under 35 U.S.C. 154(b) by 160 days.

(21) Appl. No.: 10/541,969

(22) PCT Filed: Jan. 16, 2004

(86) PCT No.: PCT/US2004/001134

§ 371 (c)(1),
(2), (4) Date: Jul. 12, 2005

(87) PCT Pub. No.: WO2004/066275

PCT Pub. Date: Aug. 5, 2005

(65) Prior Publication Data

US 2007/0001836 A1 Jan. 4, 2007

Related U.S. Application Data

(60) Provisional application No. 60/516,122, filed on Oct. 31, 2003, provisional application No. 60/440,499, filed on Jan. 16, 2003.

(51) Int. Cl.
*G08B 21/00* (2006.01)

(52) U.S. Cl. .................. 340/540; 340/541; 340/568.8; 340/572.1

(58) Field of Classification Search .......... 340/540, 340/541, 545.2, 547, 542, 545.7, 568.8, 571, 340/565, 572.1; 348/143, 152, 155, 64, 61, 348/739, 207.9; 378/98, 98.12
See application file for complete search history.

(56) References Cited

U.S. PATENT DOCUMENTS

| | | | |
|---|---|---|---|
| 5,196,846 A * | 3/1993 | Brockelsby et al. ...... 340/10.51 |
| 6,104,336 A | 8/2000 | Curran et al. | |
| 6,343,213 B1 * | 1/2002 | Steer et al. ................. 455/411 |
| 6,405,112 B1 | 6/2002 | Rayner | |
| 6,480,103 B1 | 11/2002 | McCarthy et al. | |
| 6,542,716 B1 * | 4/2003 | Dent et al. ................. 455/13.1 |
| 6,559,769 B2 * | 5/2003 | Anthony et al. ............. 340/574 |
| 6,624,611 B2 * | 9/2003 | Kirmuss ..................... 320/104 |

(Continued)

FOREIGN PATENT DOCUMENTS

WO 2004/066275 A2 8/2004

OTHER PUBLICATIONS

Response to Examination Report filed in The United Kingdom Intellectual Property Office on Jun. 26, 2007 regarding U.K. Patent Application No. 0700543.2.

(Continued)

*Primary Examiner*—George A Bugg
*Assistant Examiner*—Daniel Previl
(74) *Attorney, Agent, or Firm*—Faegre & Benson, LLP

(57) ABSTRACT

Systems and methods for surveillance in a mobile environment. In some cases, the systems and methods utilize a variety of image and/or audio sensors to record activity ongoing in a mobile environment. In one particular embodiment, the activity is temporarily recorded in a first tier memory implemented as a volatile FIFO. Where a trigger input is detected, the activity is recorded in a second tier memory that can be configured as a non-volatile memory. Further, in some cases the recorded activity can be transmitted wirelessly to a remote location.

36 Claims, 9 Drawing Sheets

U.S. PATENT DOCUMENTS

| | | | |
|---|---|---|---|
| 6,751,546 B2 | 6/2004 | Yamashita | |
| 6,778,100 B2* | 8/2004 | Schempf | 340/870.07 |
| 6,819,245 B1* | 11/2004 | Dilling | 340/572.1 |
| 7,046,275 B1* | 5/2006 | Yamada et al. | 348/220.1 |
| 2003/0041329 A1* | 2/2003 | Bassett | 725/105 |

OTHER PUBLICATIONS

Combined Search and Examination Report from the United Kingdom Intellectual Property Office dated Feb. 26, 2007 regarding U.K. Patent Application No. 0700543.2.

Response to Further Examination Report filed in The United Kingdom Intellectual Property Office on Jan. 11, 2007 regarding U.K. Patent Application No. 0515159.2.

Further Examination Report from the United Kingdom Intellectual Property Office dated Nov. 16, 2006 regarding U.K. Patent Application No. 0515159.2.

Response to Examination Report filed in The United Kingdom Intellectual Property Office on Sep. 28, 2006 regarding U.K. Patent Application No. 0515159.2.

Examination Report from the United Kingdom Intellectual Property Office dated Mar. 28, 2006 regarding U.K. Patent Application No. 0515159.2.

International Search Report and Written Opinion of the International Searching Authority for PCT/US04/01134 dated Oct. 12, 2004.

* cited by examiner

SYSTEMS AND METHODS FOR MOBILE SECURITY AND MONITORING

CROSS REFERENCE TO RELATED APPLICATIONS

The present application is a national stage application under 35 U.S.C. § 371 of PCT/US04/01134, filed on Jan. 16, 2004, which claims the benefit of U.S. Provisional Patent Application No. 60/440,499 entitled "Mobile Surveillance System With Camera", and filed on Jan. 16, 2003; and U.S. Provisional Patent Application No. 60/516,122 entitled "Mobile Surveillance System With Camera", and filed on Oct. 31, 2003. The entirety of each of the aforementioned provisional patent applications is incorporated herein by reference for all purposes.

BACKGROUND OF THE INVENTION

The present invention generally relates to systems and methods for surveillance, and in particular to systems and methods utilizing digital recording to perform surveillance in a mobile environment.

Many surveillance systems use various types of video cameras to record images. Some systems operate when an intruder is identified, while other systems operate on a continuous basis. Generally, such cameras record images in response to a signal from one or ore detectors such as infrared or motion detectors.

Traditionally, the image from the camera is recorded on video tape. In some newer systems, the image is recorded on a computer disk or removable memory card, such as described in published patent application WO 01/82255, the entirety of which is incorporated herein by reference for all purposes.

SUMMARY OF THE INVENTION

Some embodiments of the present invention provide a stand-alone integrated digital surveillance systems for use in a mobile environment, such as automobiles, trucks, airplanes, trains, and the like. These surveillance systems can include a relatively small control module having the capability to receive image input from one or more image sensors and/or audio input from one or more audio sensors. As one example, various image sensors can be placed within the interior and exterior of an automobile that is being monitored. Each of the sensors can provide an image output to the control module via either a cable or wireless connection. The image information can then be stored in a memory system that can include a combination of volatile and non-volatile memory elements, and/or transmitted wirelessly to another location.

The control module also has the capability to receive one or more trigger inputs. When activated, either alone or in combination, these trigger inputs can cause the control module to store received image and/or audio information on a more permanent basis. In some cases, these triggers are activated by external systems, such as an auto alarm, motion sensor, auxiliary trigger, wireless trigger, or the starting or change of an airline electronic system. Each time the system is triggered, it saves a user selected amount of time of image signals that are flushing through, for example, a volatile first in, first out (hereinafter "FIFO") memory, to a more permanent memory such as a flash memory card. Because the image is temporarily stored in memory, the system has the ability to save buffered video from before and after the triggering event.

Some embodiments of the present invention provide surveillance systems that include an image sensor and an audio sensor. The image sensor and audio sensor are communicably coupled to a system controller that receives an image signal from the image sensor and an audio signal from the audio sensor. Derivatives of the image and audio signals are provided as an output from the system controller. The system further includes a trigger input, as well as a memory system and wireless communication link that operate based at least in part on the trigger input. Thus, for example, the memory system can be responsible for storing the derivative of the image signal on a continuous basis to one portion of the memory system, and upon receiving the trigger input, the memory system can also store the derivative of the image signal to another portion of the memory system. Similarly, the wireless communication link can transfer the derivative of the image signal based upon reception of the trigger input.

In some cases, the memory system includes a flash memory card and a FIFO memory. In one particular embodiment, image and/or audio information is continuously transferred to the FIFO, and upon an event trigger, the image and/or audio information can be unloaded to the flash memory card. This can include unloading a portion of the image and/or audio information beginning from a preset period before receiving the trigger input and continuing through a preset period after the trigger input.

In some cases, the systems include a power detection module that indicates a status of a power source. Where the status of the power source indicates that insufficient power remains, one or more changes in system operation can be effected. For example, the system may stop a continuous storage of the derivative of the image signal, while still storing the derivative of the image signal upon receiving the trigger input. This can be of particular use in the case of a mobile environment that does not have access to an unlimited power supply.

In various instances, the trigger input includes two or more trigger inputs. Thus, for example, the trigger input can include an alarm associated with an automobile in which the system is installed and the ignition switch from that automobile. These trigger inputs can work either in combination or apart. Thus, for example, when the car alarm is activated, the derivative of the audio and/or image signals can be stored to a second tier memory, and where the ignition switch is activated, the derivative of the audio and/or image signals may be transmitted via the wireless link. Alternatively, nothing may occur until both the alarm and ignition switch are activated. Based on the disclosure provided herein, one of ordinary skill in the art will appreciate the myriad of trigger inputs that are possible. For example, the trigger inputs can include, but are not limited to, an alarm signal, a door lock signal, a door open signal, an acceleration signal, a panic signal, and/or a geographic boundary signal.

Other embodiments of the present invention provide methods for performing surveillance in a mobile environment. These methods involve providing an image sensor, and a tiered memory that includes at least a first tier memory and a second tier memory. An image signal is received from the image sensor, and a derivative of the image signal is stored to the first tier memory on a continuous basis. Then, based at least in part upon receiving a trigger input, the derivative of the image signal is stored to the second tier memory.

Various embodiments of the methods further include providing an audio sensor; receiving an audio signal from the audio sensor; storing a derivative of the audio signal to the first tier memory; and based at least in part upon the trigger input, storing the derivative of the audio signal to the second tier memory.

The methods can also include charging a power supply maintained in association with the system; monitoring a power source to detect a power source status; modifying the system based on the power source status to stop storing the derivative of the image signal to the first tier memory; and/or providing a wireless communication link and based at least in part upon the trigger input, transmitting the derivative of the image signal and/or audio signal via the wireless communication link.

Yet other embodiments of the present invention provide surveillance systems that can be associated with a mobile environment. Such systems can include two or more image sensors that create respective images relative to the mobile environment. A system controller is communicably coupled to the image sensors and electrically coupled to a tiered memory system. The tiered memory system includes a first tier memory and a second tier memory. One or more images provided by the various image sensors are stored to the first tier memory, and upon activation of a trigger input, one or more of the images are stored to the second tier memory.

This summary provides only a general outline of some embodiments of the present invention. Many other objects, features, advantages and other embodiments of the present invention will become more fully apparent from the following detailed description, the appended claims and the accompanying drawings.

DESCRIPTION OF THE DRAWINGS

A further understanding of the various embodiments of the present invention may be realized by reference to the figures which are described in remaining portions of the specification. In the figures, like reference numerals are used throughout several to refer to similar components. Where a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE ILLUSTRATIVE EMBODIMENTS

Figure 1:
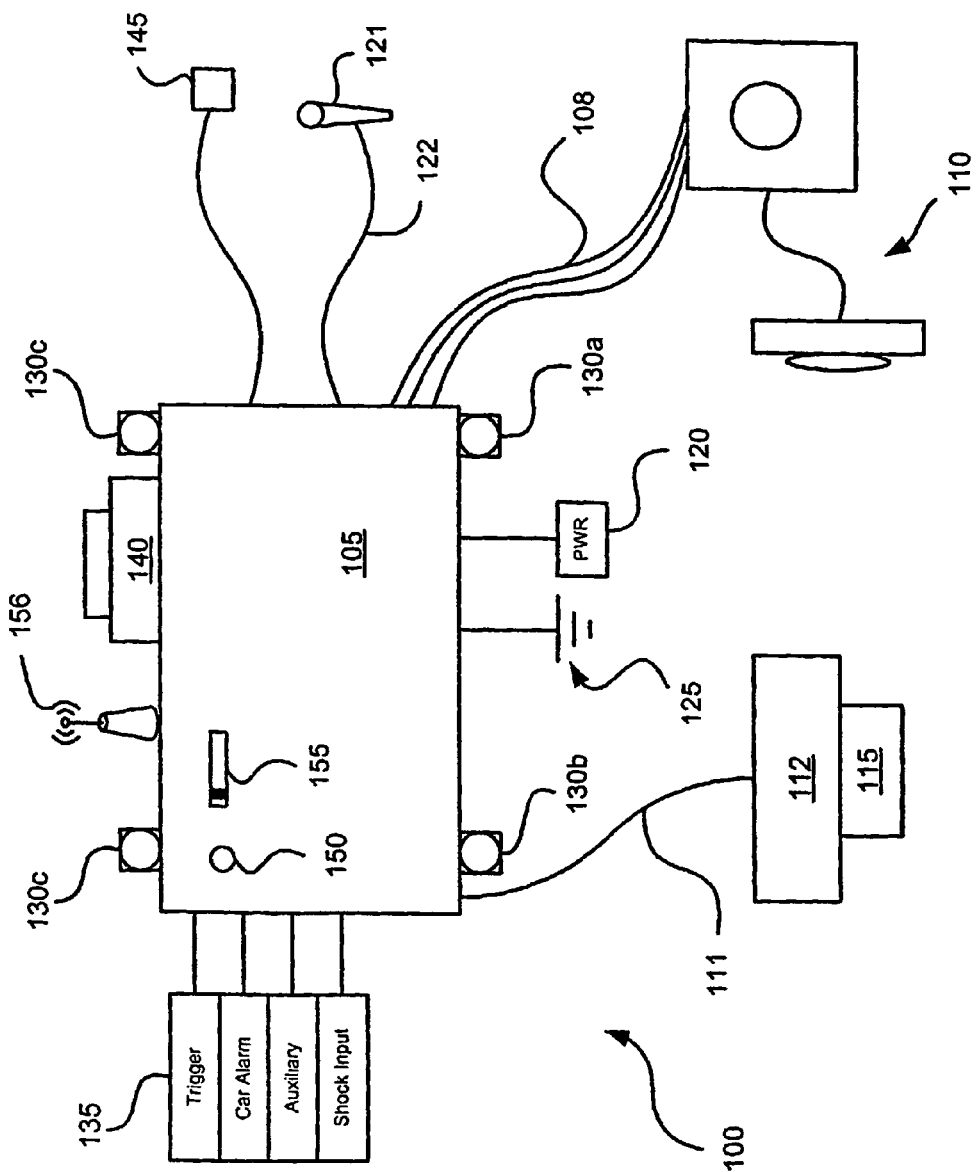
FIG. 1 depicts a system in accordance with various embodiments of the present invention.

Various embodiments of the present invention provide a stand-alone integrated digital surveillance systems for use in a mobile environment. As used herein, a mobile environment can be any environment that is removed from a limitless source of electrical energy. Thus, for example, an automobile can be a mobile environment where the source of electricity is the car battery. Other mobile environments include trucks, airplanes, trains, boats, motorcycles, laptop computers, and/or the like.

Surveillance systems in accordance with the present invention can include a relatively small control module having the capability to receive image input from one or more image sensors and/or audio input from one or more audio sensors. Such image sensors can be any sensor capable of detecting an image, and transferring that image to the control module. Some examples of image sensors include, but are not limited to, digital video cameras, analog video cameras, digital still cameras, radar sensors, ultrasound sensors, and/or the like. Audio sensors can be any sensor capable of detecting sound, and transferring the detected sound to the control module. Thus, audio sensors can be, but are not limited to, a digital microphone, and analog microphone, and the like. When the term sensor is used herein without being designated as a particular type of sensor, it is interpreted to mean any type of sensor capable of providing an output indicating some sensed activity. Thus, for example, a "sensor" can be, but is not limited to, an "image sensor" or an "audio sensor".

The control module includes a system controller typically packaged in an aesthetically pleasing package. Such system controllers can include one or more microprocessors, signal input circuitry, signal output circuitry, and/or memory for holding instructions executable by the one or more microprocessors. As previously suggested, the system controller can be either electrically coupled and/or communicably coupled to various trigger inputs, audio inputs, image inputs, audio outputs, image outputs, a memory system, and/or the like. As used herein, communicably coupled is interpreted in its broadest sense and implies any coupling whereby information can be passed to or from a coupled device or system. Similarly, as used herein, electrically coupled is interpreted in its broadest sense and implies any coupling whereby information can be passed via electrical signals to or from a coupled device or system. Based on this disclosure, one will appreciate that communicably coupled is a superset of electrically coupled, and where the terms communicably coupled and electrically coupled are used together, in some cases both operations may be electrically coupled, while in other cases one operation may be electrically coupled while the other is, for example, wirelessly coupled.

As one example, various image sensors can be placed within the interior and exterior of an automobile that is being monitored. Each of the image sensors can provide an image output to the control module via an electrically coupled and/or communicably coupled connection. This image output can be any type of image output including, but not limited to, RS-170 video, High MPEG and other digital video formats, JPEG and other still image formats, and/or the like. The image signal can be translated where necessary, and stored on a continuous basis to a volatile memory maintained as part of the control module. This translation can include, for example, translating an image signal from the analog domain to the digital domain, and/or translating the image signal between two formats in the digital domain. As used herein, a signal passed from a sensor to the control module and then output to a memory or wireless link is a derivative signal. Thus, for example, where an image sensor provides an image signal in the form of an analog video output, and that analog video output is translated to the digital domain and then stored to memory, the signal stored to memory is a derivative of the image signal. Similarly, where an image sensor provides an image signal in the form of an digital video output, and that digital video output is merely passed directly through to memory, the signal stored to memory is a derivative of the image signal. A derivative of the image and audio signals can also be referred to as image and audio streams, respectively.

Continuing with the example, upon activation of one or more trigger inputs, the system controller can cause the derivative of the image and/or audio signals to be stored to a more permanent memory. As used herein an trigger input can be any input that when activated indicates the occurrence of a specified event. Thus, for example, an electrical signal indicating that a car alarm has been activated can be an trigger input. As yet another example, a trigger input can be a shock sensor indicating that an automobile or other mobile environment has sustained an impact or some significant acceleration or deceleration. As another example, a timer that is activated once per hour can be an trigger input. Another example can be an indicator that the car stereo has been removed from its installed location. Based on the disclosure provided herein, one of ordinary skill in the art will recognize a myriad of other trigger inputs that can be used in accordance with embodiments of the present invention. Further, the more permanent memory can be, for example, a non-volatile memory, a magnetic memory; a flash memory card, and/or the like. Further, upon activation of one or more trigger inputs, the system controller can cause the derivative of the image and/or audio signals to be transmitted wirelessly to another location. The other location can be, for example, a cellular telephone, a personal digital assistant (hereinafter "PDA"), a personal computer, a security company, an internet server, and/or the like. A similar process can be implemented in relation to audio data received from one or more audio sensors.

As used herein, a tiered memory system can be any memory system that includes two or more memory elements designed to operate based on differing stimuli. Thus, for example, a tiered memory system can include a first tier memory implemented, for example, as a volatile FIFO memory, and a second tier memory implemented as a non-volatile flash memory card. In operation, the FIFO may be continuously loaded and flushed with image information derived from one or more image sensors, while the volatile flash memory card is only loaded with image information when an trigger input is activated. A third tier memory including a non-volatile memory integral to the unit (where the other non-volatile memory is removable from the unit) can also be included. Where this is included, both the second and third tier memories may be written in parallel, thus leaving the third tier memory as a backup for the second tier memory if it is removed and lost.

Turning to FIG. 1, an embodiment of a surveillance system 100 in accordance with some embodiments of the present invention is illustrated. Surveillance system 100 includes a control module 105 that is connected to an image sensor 110 via connection 108, a multimedia card writer/reader 112 including a solid state memory card 115, a power source 120 and a ground 125. Power source 120 can be any power source including, for example, a car battery associated with an automobile in which system 100 may be installed. Solid state memory writer/reader 112 can be integrated with control module 105 or coupled to control module 105 via a connection 111. In this embodiment control module 105 has one or more mounting tabs 130 that can be used to secure control module 105 in an installed location. Further, control module 105 includes one or more trigger inputs 135, an expansion port 140, a testing output 145, an LED 150 for indicating that status of control module 105, and a power switch 155 for system 100. Images captured by the system can be viewed on an audio/visual system via the testing output 145. Further, the image and/or audio sensors can be placed in hidden and/or inconspicuous locations within the mobile environment. Further, such systems can be installed in private and public transportation systems. Where audio and visual information is captured, the different information can be synchronized into a single file, or not synchronized and maintained in separate files.

Expansion port 140 allows future functionality to be added by connecting add-on devices. Exemplary add-on devices include a global positioning satellite device, a wireless expansion module that allows data to be sent to a remote location via cellular telephone, a wi-fi network, or a device that links the system 100 to third party systems such as OnStar™ or LoJack™. Further, expansion module 140 allows for the addition of circuitry to make system 100 inter-operate with an external video system such as, for example, a video system installed in an automobile.

In some cases, to reduce the profile of system 100 and/or to ease installation of system 100, control module 105 can be relatively small. In one particular embodiment, control module 105 is housed in a four inch by six inch by one and one half inch plastic case. In addition, testing output 145 can be used to test the installation and operation of control module 105. In one case, testing output 145 provides an analog video output signal indicative of a derivative image signal being stored within a memory associated with control module 105.

Figure 7:
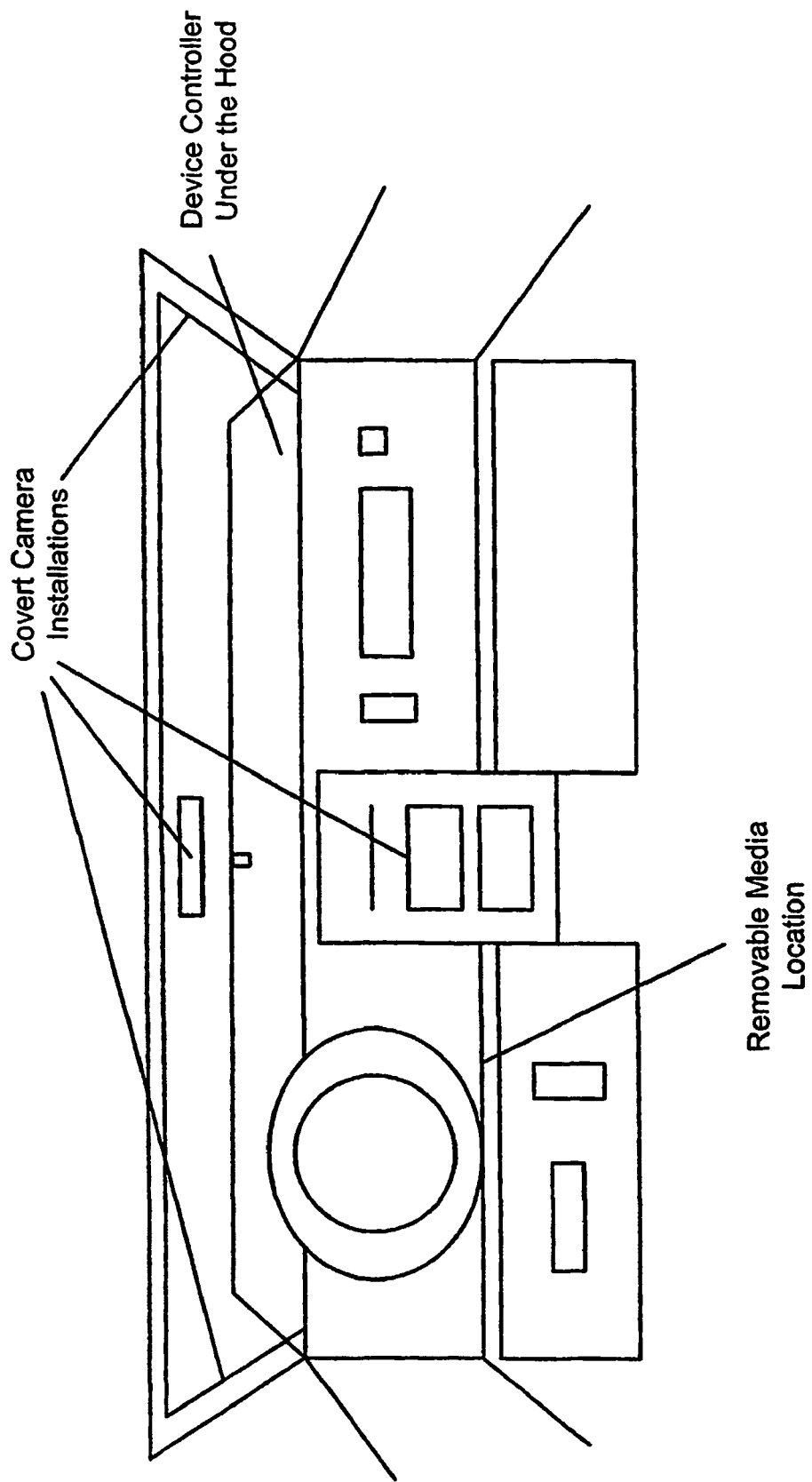
FIG. 7 depicts optional automobile installation locations for the present invention.
Figure 8:
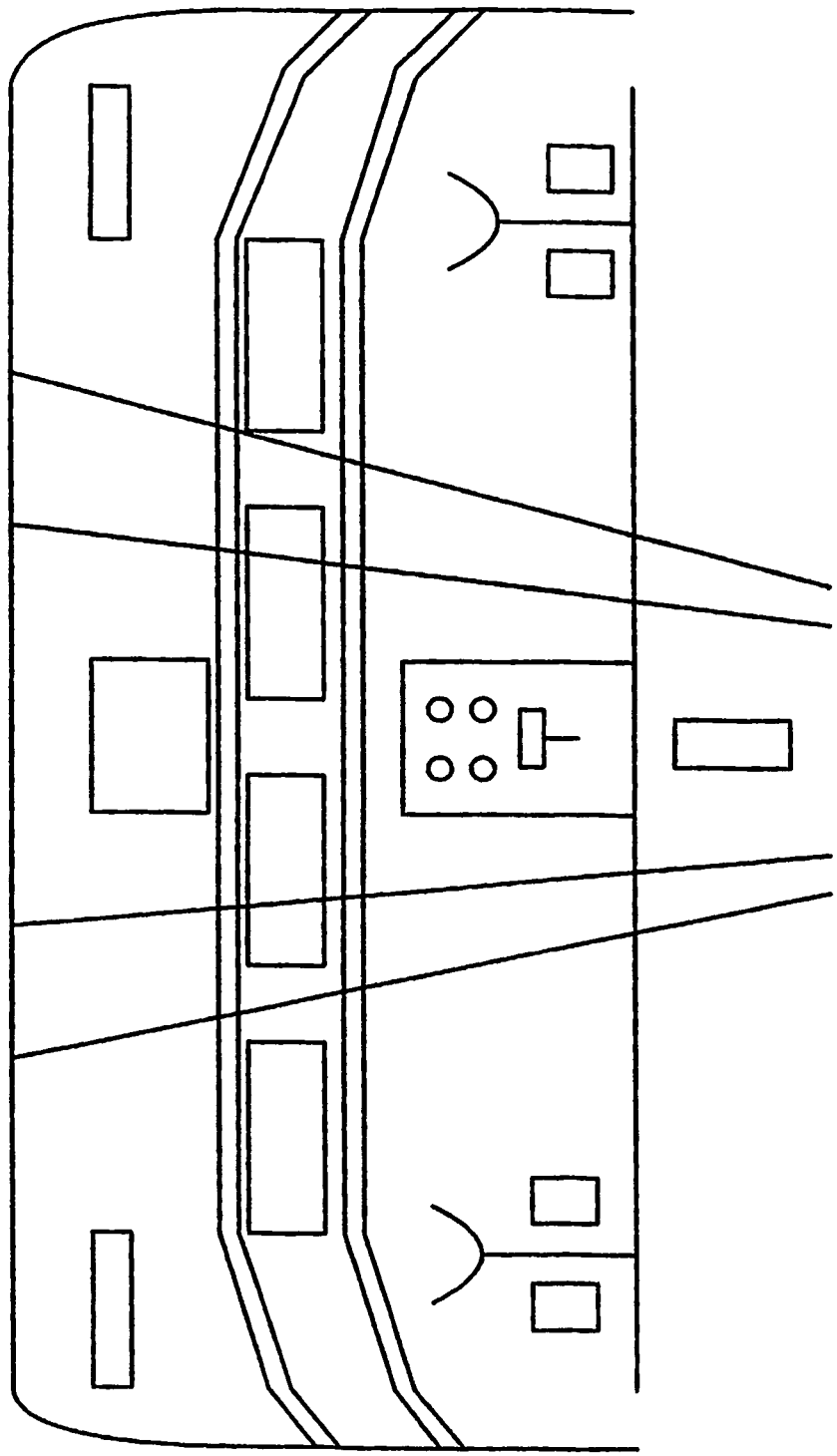
FIG. 8 depicts optional aircraft cockpit installation locations for the present invention.

Connection 108 allows video created by camera 110 to be received by control module 105. In an embodiment, connection 108 is a thin cable that easily facilitates installation of system 100 surreptitiously in the interior of a vehicle such as an automobile, as shown in FIG. 7, or the interior of an airplane, as shown in FIG. 8. Alternatively, a wireless connection, using for example an 802.11b protocol or a bluetooth protocol could be used to transmit video from one or more cameras 110 to control module 105.

Control module 105 is capable of storing video received from camera 105 on solid-state memory card 115, such as Compact Flash, or Secure Digital device by sending information via connection 111 to multimedia card writer 112. Further, control module 105 can include a wireless link 156 capable of transmitting and/or receiving information. This can include transmitting video information to a location remote from control module 105. Further, system 100 can include an audio sensor 121 that can be either wirelessly connected to control module 105, or connected via a physical connection 122. Audio information, similar to video information can be stored by control module 105. Based on the disclosure provided herein, those of ordinary skill in the art will appreciate that image information can be stored on memory card 115 using a variety of formats such as JPEG or MPEG files. Similarly, audio information can be stored in a variety of audio formats known in the art. In addition, other information, such as date and time information or a digital signature can be stored on memory card 115 by control module 105. Similar to connection 108, connection 111 can be implemented using a wire or wireless connection. Further, in some cases, the stored information may be intended for a later legal proceeding, and thus may be written to card 115 in a tamper proof format.

Trigger inputs 135 can be used to control the storage of video information on memory card 115. In some cases, trigger inputs 135 are connected to external systems (not shown), such as an auto alarm, motion sensor, auxiliary trigger, wireless trigger, or the starting of an airline electronic system. In one particular embodiment, four normally open, and four normally closed trigger inputs are included with control module 105. Each time a trigger input 135 receives an appropriate electrical signal control module 105 will cause multimedia card writer 112 to store a finite amount video to memory card 115.

Writer/reader 112 can also be utilized to configure the operation of control module 105. Specifically, automatic setup information can be saved on a memory card 115. Upon start-up, control module 105 will look for the existence of a configuration file on memory card 115. If such a file is found, the information will be read to configure various operating parameters of control module 105. Such operating parameters could include image quality, frame rate, recording time prior to and after a trigger, delay between frames, enabling cyclic recording mode. Additional information concerning such parameters is set forth in Table 1.

TABLE 1

| Parameter | Description |
| --- | --- |
| Timeout period | To save battery power, the system should power down X days (possibly hours) after the most recent triggered event. A value of 0 will disable this feature. |
| Saving before | The number of seconds of data to save previous to the event. |
| Saving after | The number of seconds of data to save after the event. |
| Sampling frequency | How many times per second the system will sample data from the video sources |
| Image quality | The resolution of the images that are recorded. |
| Fast save time | X seconds of data to save after waking up from sleep mode. |

Figure 2:
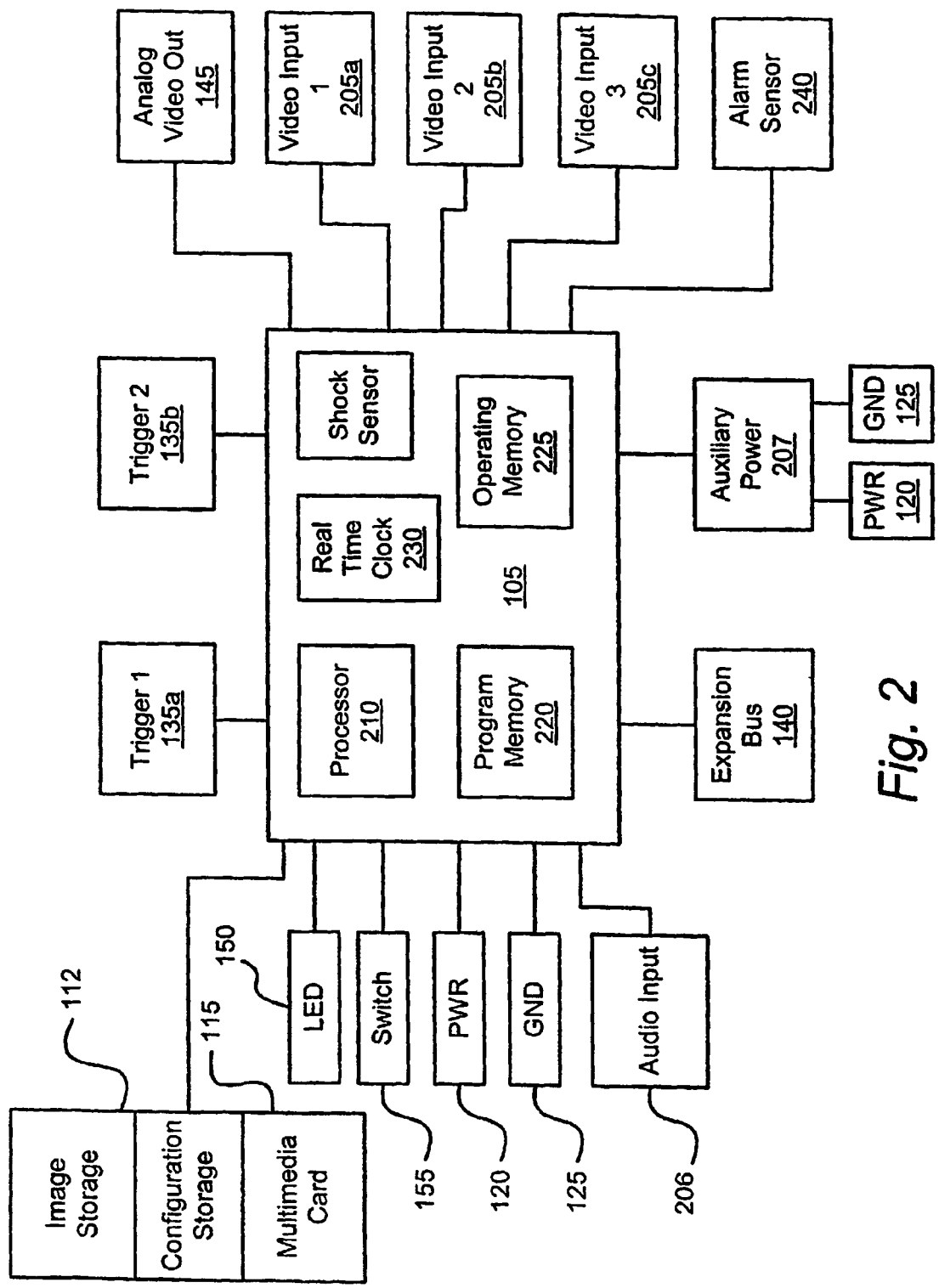
FIG. 2 depicts a block diagram of the system depicted in FIG. 1.

FIG. 2 is a block diagram of the system depicted in FIG. 1. As illustrated, control module 105 has one or more image inputs 205, one or more audio inputs 206, a processor 210, program memory 220, operating memory 225, real time clock 230, accessory power sensor 235 and alarm power sensor 240. In the embodiment, the use of operating memory 225 allows control module 105 to continuously save buffered image data from image inputs 205. Thus once a triggering event has been sensed by one or a combination of trigger inputs 135, control module 105 can save video frames from before and after the triggering event (and stored in operating memory 225) to multimedia card 115. Control module 105 also includes a rechargeable power source 207 that is attached to power 120 and ground 125.

In one particular embodiment, control module 105 further includes an internal rechargeable battery, charging and power control circuitry for monitoring an external power source and/or charging the internal rechargeable battery. The internal rechargeable battery can allow for storage of a triggered event even where power from an external power source is not available. In one particular case, this charging and power control circuitry is implemented in processor 210, while in other embodiments, it is implemented in another processor that is independent of processor 210. One embodiment includes a total of four image inputs 205, and a total of eight trigger inputs 135 (four normally open and four normally closed). The embodiment also includes two audio inputs and an internal shock sensor capable of detecting an impact, or some other significant increase or decrease in acceleration. Also, the embodiment can include image compression and/or translation circuitry Additional information concerning the operation of various components is further set forth in Table 2.

TABLE 2

| Trigger 1 | Senses Ground |
| --- | --- |
| Trigger 2 | Senses +12 v |
| Analog Video Out | Outputs signal from Video input 1 |
| Video input 1 | Video signal input |
| Video input 2 | Video signal input |
| Video input 3 | Video signal input |
| Expansion bus | Serial/USB/Proprietary?? |
| Multimedia Card | Compact Flash/SD/etc. |
| Positive | +12 v input. |
| Ground | Ground to chassis. |
| Power | On/Off switch |
| L.E.D | Power L.E.D |
| Alarm sensor | Senses state of auto alarm (armed/disarmed) |
| Accessory Power | Senses +12 v when ignition is on. |

The length of video that is stored in memory card 115 can by defined by a user using the initialization procedure set forth in Table 1 above. For example, a user could specify that control module 105 should save the video from one minute before, and three minutes after the triggered event. After each triggered event is sensed by trigger inputs 135, control module 105 will continue to monitor the cameras and record images to operating memory 225 until the next triggering event is sensed.

Because memory card 115 is capable of holding only a finite amount of image and/or audio data, control module 105 can have three modes for saving data. The first mode writes data to card 115 until it is full, at which point it will halt the recording process. The second mode writes over the oldest data on the card when card 115 is full. The second mode is called Cyclic mode (FIFO). This mode will continue to save data at each event until the system is turned off or deactivated. The third mode continuously writes data to operating memory 225 configured as a FIFO, and upon a defined trigger input 135, stores information from operation memory 225 to card 115.

A user can access the images stored on card 115 by using a personal computer having a memory card reader. In the embodiment, each image is encoded to insure tamper proof images. For example, a checksum associated with each image could be generated by control module 105 to allow the user to verify the integrity of the image. After the user moves the images off of memory card 115 (or deletes them), memory card 105 can be inserted back into reader/writer 112. In the event that the FIFO method is used for image storage the card would not have to be erased to continue its use.

System 100 begins monitoring trigger inputs 135 when it receives a signal from an external sensor, such as alarm sensor 240 (indicating that an alarm system has been armed or disarmed). While monitoring, system 100 is constantly storing images in a First-In/First-Out buffer. Those skilled in the art recognize that the size of the buffer is limited by the amount of operating memory 225. In one particular embodiment, operating memory 225 is sized to hold approximately four minutes of video image information along with time stamps and/or audio information. Those skilled in the art will recognize that the calculation of the memory size is dependent on frequency and quality (e.g., resolution, color bit level setting) of the images. In one particular embodiment, video images are stored at a rate of ten frames per second. However, other frame rates can be used in accordance with embodiments of the present invention.

Figure 3:
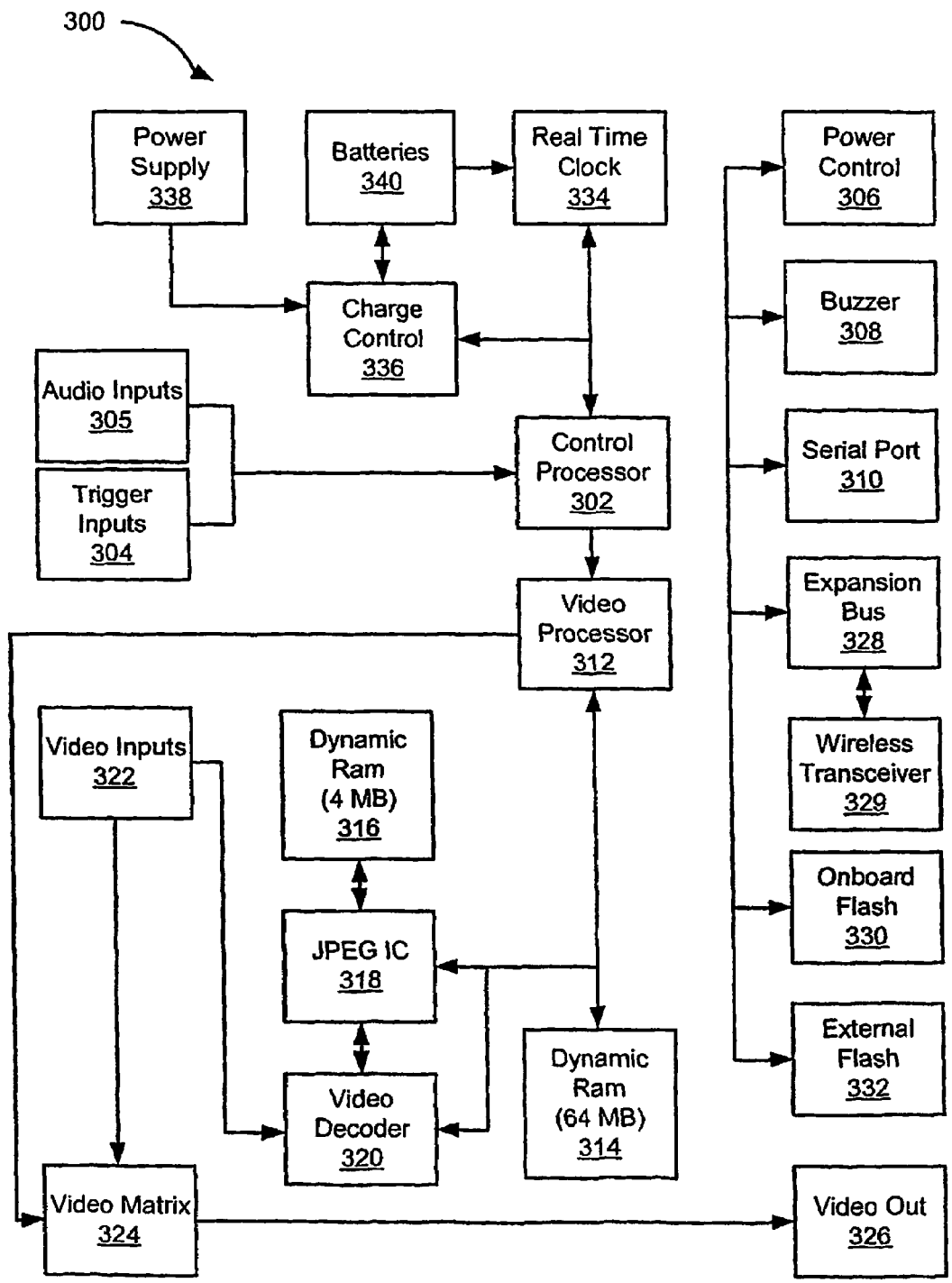
FIG. 3 depicts a block diagram of a system controller in accordance with some embodiments of the present invention.

Turning to FIG. 3, a block diagram 300 of a system controller in accordance with some embodiments of the present invention is illustrated. Block diagram 300 includes a control processor 302. In one particular embodiment, control processor 302 is a low power microprocessor capable of performing analog to digital conversions. Control processor 302 can be configured to receive one or more trigger inputs 304, such as an auto alarm, motion sensor, auxiliary trigger, wireless trigger, or the starting or change of an airline electronic system, and/or the like. Further, control processor can be configured to receive one or more audio inputs or audio streams via audio inputs 305. Control processor 302 is programmed to control various devices, including an image sensor power control 306, a buzzer 308, and/or various remote devices via a serial port 310 and/or an expansion bus 328. For example, a wireless transceiver 329 can be controlled via expansion bus 328. Information can be transferred to/from wireless transceiver 329.

Image signals are received from image sensors attached to attached to the system controller via video inputs 322. In some cases, video inputs 322 can be converted to video outputs under direction of a video matrix 324. Video matrix 324 can redirect video information to a video output 326. Such conversion allows for verifying operation of the system. A video decoder 320 can be included to convert an analog video stream to a digital video stream in embodiments where the image sensors used are, for example, NTSC video cameras. Alternatively, where a digital image sensor is used, decoder 320 is not necessary. Further, a compression block 318 is employed to translate received image data from one format to another. Thus, for example, image information may be received in some standard raster format, and compression block 318 can translate that raster format to a compressed image format as are known in the art such as, for example, JPEG or MPEG. A video frame buffer 316 and/or an operational memory 314 as are known in the art can also be used.

A video processor 312 controls image compression, translation, decoding, and the video matrix. Further, video processor 312 can send received image signals to a remote location via wireless transceiver 329. Thus, for example, image information captured by the device can be sent to a computer at a location remote from the device. Further, video processor 512, under the direction of control processor 302 can store image information captured by the device to a tiered memory system including a volatile FIFO, and one or more non-volatile memories such as an onboard flash memory 330 and/or an external flash memory 332.

Control processor 302 further controls other devices, such as a real-time clock 334 that can be used to provide time stamp information stored with captured image and/or audio information. Further, control processor 302 is coupled to a charge control block 336 that is responsible for determining the status of power provided to the system, and for indicating to control processor 302 the need for an operational change when insufficient power is available. Charge control block 336 is also responsible for charging batteries 340 using power from a power supply 338. Power supply 338 can be, for example, a car battery.

Figure 4:
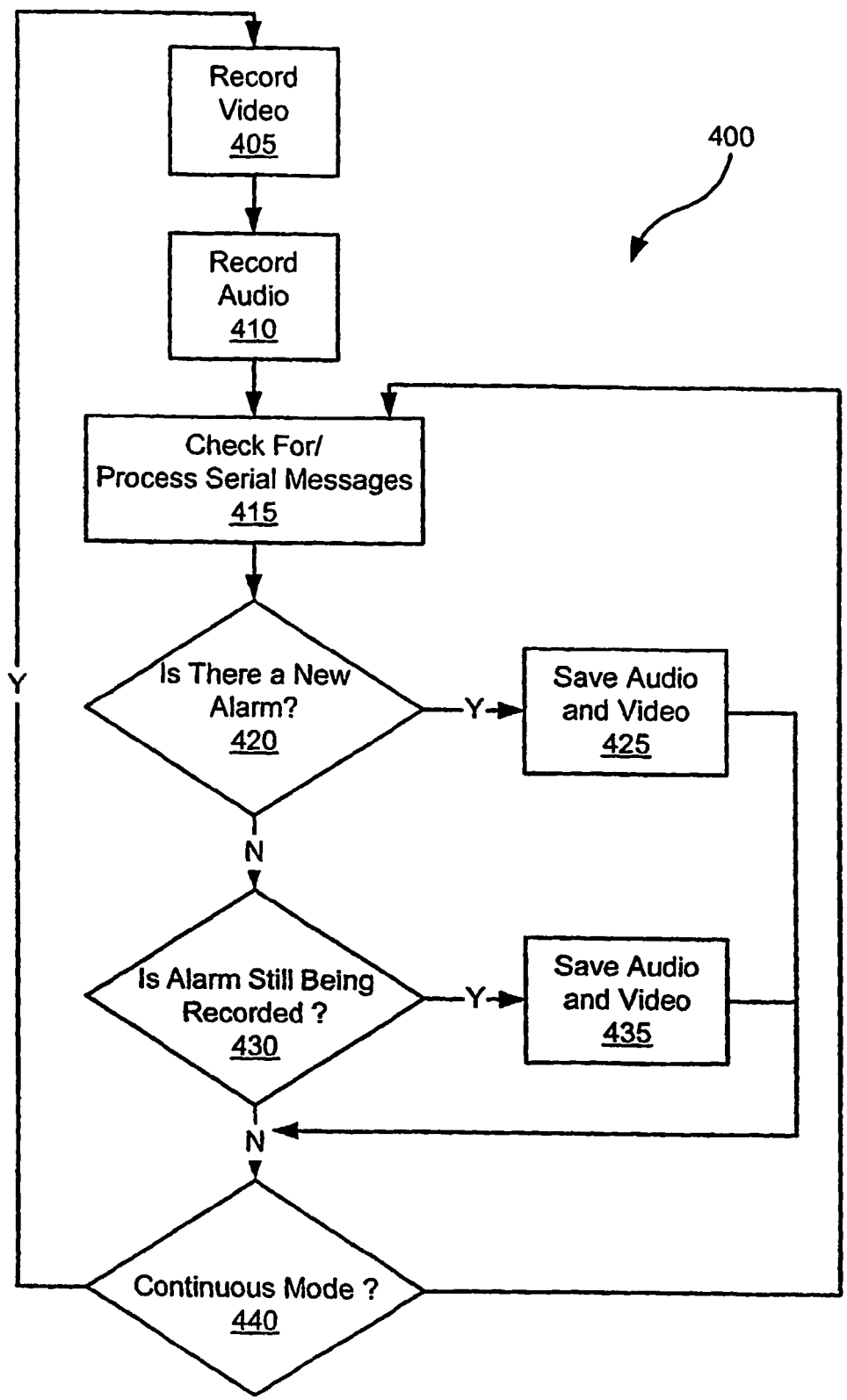
FIG. 4 is a flow diagram describing two operational modes in accordance with some embodiments of the present invention.
Figure 5:
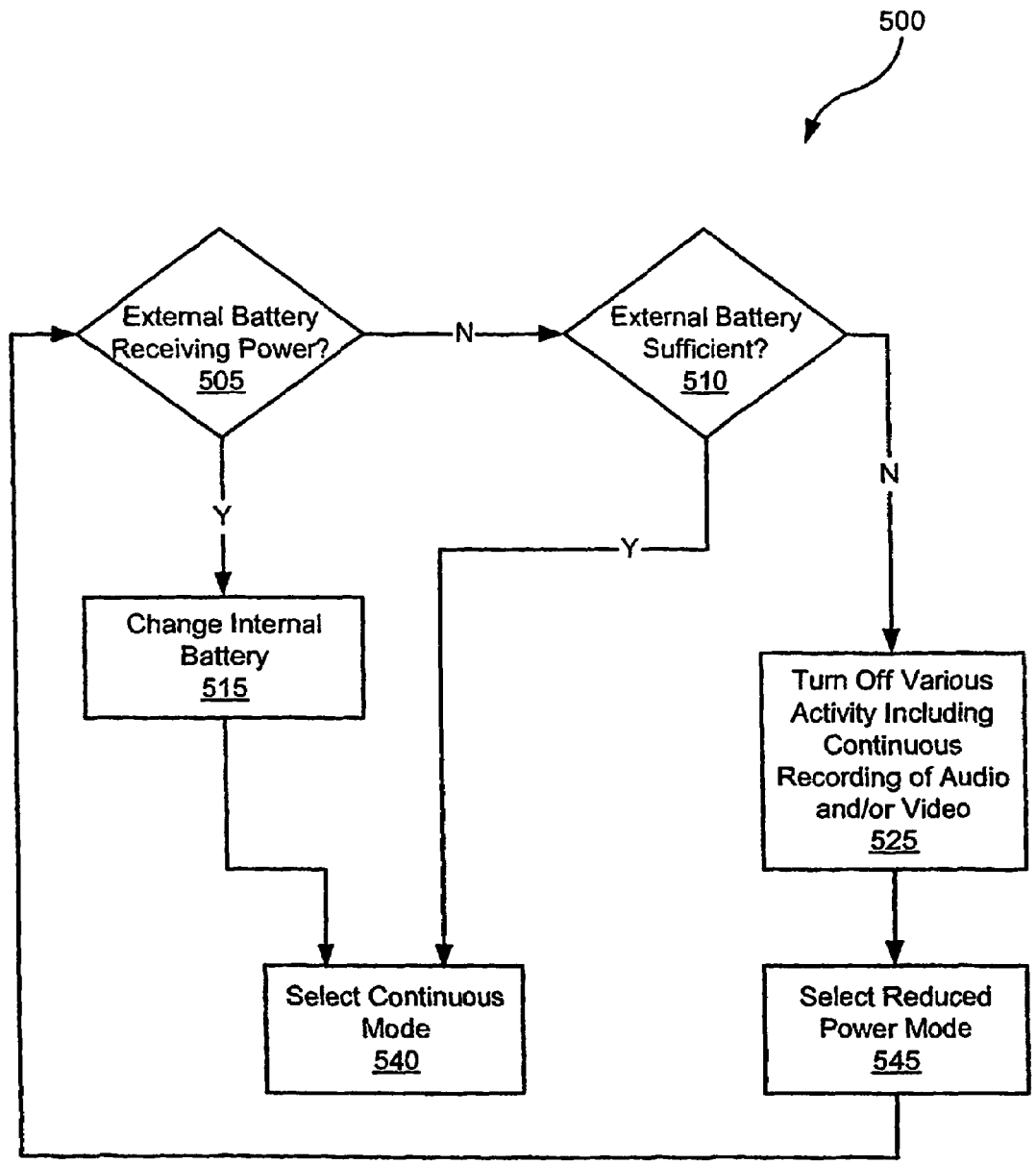
FIG. 5 is a flow diagram describing the process of switching between operational modes in accordance with various embodiments of the present invention.

Turning now to FIGS. 4 and 5, one method of operating a surveillance system in accordance with some embodiments of the present invention is discussed. FIG. 4 includes a flow diagram 400 describing two operational modes in accordance with some embodiments of the present invention. Following flow diagram 400, image signals are continuously received, translated, and stored in a FIFO memory (block 405). Similarly, audio signals are continuously received, translated, and stored to the FIFO memory (block 410). Periodically, a check is performed to determine if one or more relevant trigger inputs have been received (block 415). It is determined if the trigger input is a new trigger input (block 420). Where it is a new trigger input (block 420), pre-event recording and/or post-event recording are performed as selected by a user (block 425). Thus, for example, where a user selects to record data occurring thirty seconds prior to the trigger and continuing one minute after the trigger, a total of one and one half minutes of data representing the aforementioned time frame is transferred from the FIFO to the non-volatile memory. Once either the memory limit is exceeded, or the programmed period is met, recording is completed (block 425), and it is determined whether the system is operating in continuous or standby mode (block 440).

Selection between continuous and standby mode is further discussed in relation to FIG. 5 below. Where continuous mode is selected (block 440), image and/or audio information is recorded to the FIFO and the process repeats as discussed. Alternatively, where continuous mode is not selected (block 440), the continuous recording to the FIFO is turned off, and recording only occurs when a triggering event is detected. This eliminates the ability to save pre-event data to non-volatile memory but, as further discussed in relation to FIG. 5 below, it allows for the system to function effectively in environments where a apparent infinite power source does not exist.

Where the new alarm detected (block 420) is continued, the system operates by continuing to record audio and/or image information and an alarm will still be active (blocks 405, 410, 415). However, the alarm will not be identified as a new alarm (block 420), but rather as a continuing alarm (block 430). Where the alarm is identified as a continuing alarm (block 430), audio and/or video data from the point of the continuing alarm is moved from the FIFO to the non-volatile memory. Thus, where a trigger input is activated a continuous period of pre-event and/or post-event data is captured to the non-volatile memory (block 425) as selected by a user, and where the trigger input continues to be active after the selected period, the next continuous period of post-event data is also stored in the non-volatile memory.

FIG. 5 is a flow diagram 500 illustrating describing a process of switching between operational modes in accordance with various embodiments of the present invention. Following flow diagram 500, it is determined whether an external power source is receiving power (block 505). Thus, for example, where the external power source is a car battery or a boat battery, it can be determined if the respective car or boat is operating such that an alternator is continuously charging the external power source. Where it is found that the external power source is being charged (block 505), a battery internal to the monitoring system is charged (block 515) and the continuous operating mode is selected (block 540). Similarly, where the external battery is not receiving power (block 505), and the internal battery has sufficient power to maintain full operation of the monitoring system (block 510), the continuous operating mode is selected (block 540). As previously described in relation to FIG. 4, when the continuous operating mode is selected, audio and/or image information is continuously acquired, translated, and stored to the FIFO memory. Thus, when a trigger input is activated, information has already been acquired and events preceding activation of the trigger input can be captured to non-volatile memory (and/or uplinked over the wireless link).

Alternatively, where the external battery is not receiving power (block 505) and the internal battery is diminished to a level that continued full operation of the system is not desirable (block 510), the reduced power operating mode is selected (block 545). As previously described in relation to FIG. 4, in the reduced power mode, audio and/or image information is not continuously acquired, translated, and stored to the FIFO memory. Rather, to reduce power consumption, image and/or audio information is only acquired, translated and stored upon the activation of a trigger input. In some cases, this can include storing to the FIFO and subsequently to a non-volatile memory, or storing directly to a non-volatile memory. Further, a wireless uplink of the data can be performed either in place of or in addition to the storage in the non-volatile memory.

Figure 6:
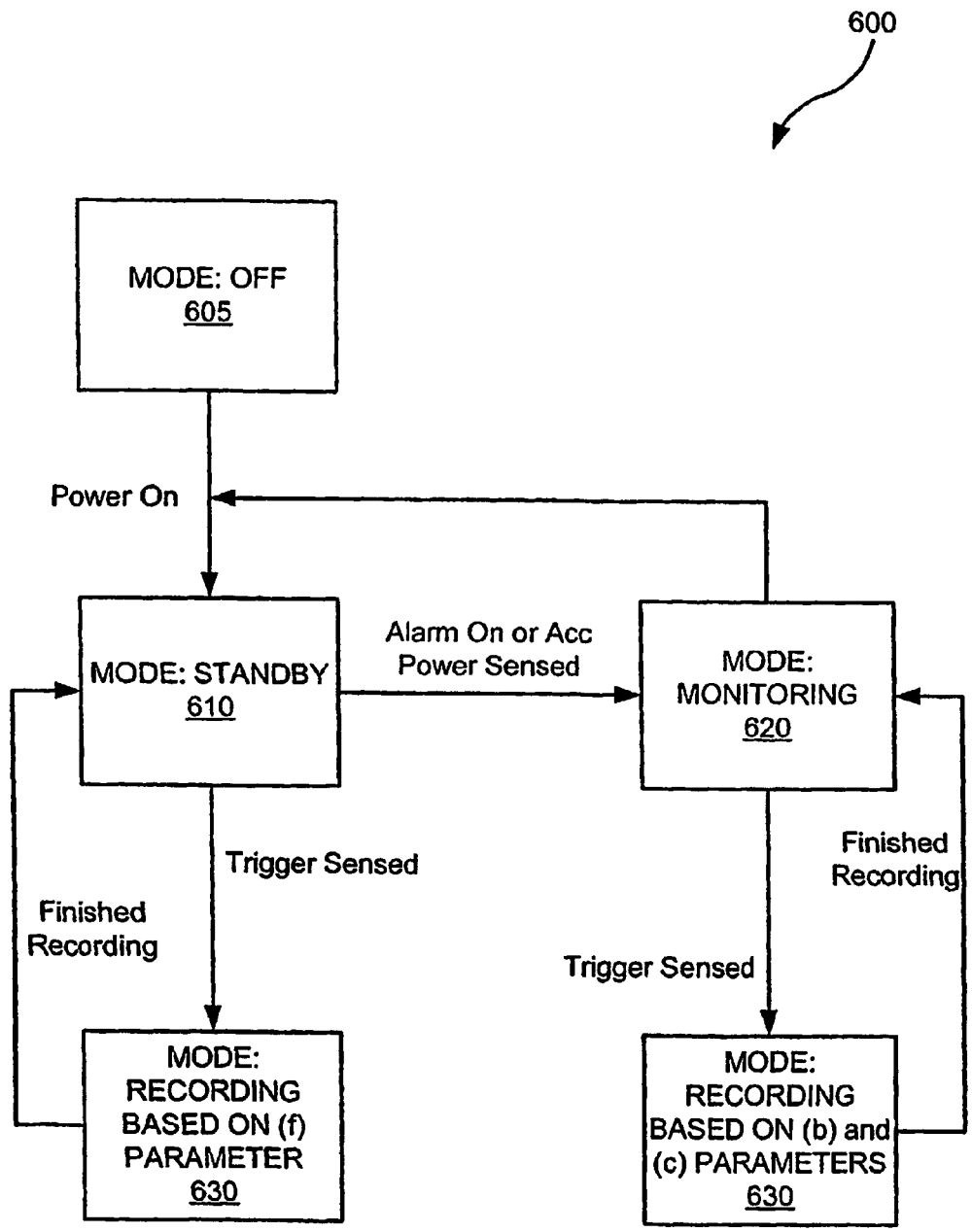
FIG. 6 is a flow diagram illustrating a standard and low power operational modes in one particular embodiment of the present invention.

Turning to FIG. 6, a flow diagram 600 illustrating a standard and low power operational modes for one particular embodiment of the present invention is presented. Following flow diagram 600, initially the system is turned off (block 605). Upon powering the system on, the system enters a standby mode (block 610) that operates similar to the mode detailed in FIG. 5. In the standby mode, when a trigger input is activated recording and/or transmission indicated by the detected trigger is performed (block 630). If, while operating in the standby mode, it is determined that sufficient power exists to more fully operate the system, the system begins operation in a monitoring mode (block 620). Where an trigger input is received, recording and/or transmission associated with the trigger input is performed (block 640). Where the system remains idle for a set period of time and/or the available power becomes insufficient to operate in a full mode, the system reverts to the standby mode (block 610). The following Table 3 describes a number of operational modes.

TABLE 3

| Operating Mode | Description |
|---|---|
| 1 | Off - No power applied |
| 2 | Monitoring/Saving data to buffer - Capturing video frames from the camera sources and storing them in a buffer. |
| 3 | Recording/Saving data to SD card - After a triggered event, the system will save X seconds of data captured PRIOR to the event from the buffer to the SD card. In addition, it will save X seconds of data captured AFTER the event to the SD card. |
| 4 | Standby - on, only waiting to enter another mode - Upon boot-up, or after reaching the timeout period (parameter a), the system will stop monitoring the cameras and will turn off any other nonessential services in order to reduce power consumption. This is the default mode of the system. |

The conditions precedent to entering the various operational modes are described in the following Table 4.

TABLE 4

If the mobile alarm is armed or the car is turned on, the system will enter monitoring mode. If the alarm is armed, the system will start a counter to keep track of how long it has been in monitoring mode. The counter does not run while the car is running. While monitoring, if a trigger is sensed, the system will enter recording mode. After recording has been completed, the system will revert back to monitoring mode. During monitoring mode, if a preset reduction in available power is detected, the system will revert back to standby mode.
If arming of an alarm is not sensed or the car is not turned on, the system will stay in standby mode. While in standby mode, if a trigger is sensed, the system will enter recording mode. It will record images to the SD card for a period set by the Fast Save Time parameter (f). After recording has been completed, the system will revert back to standby mode. In this path, no counter is kept.

Figure 9:
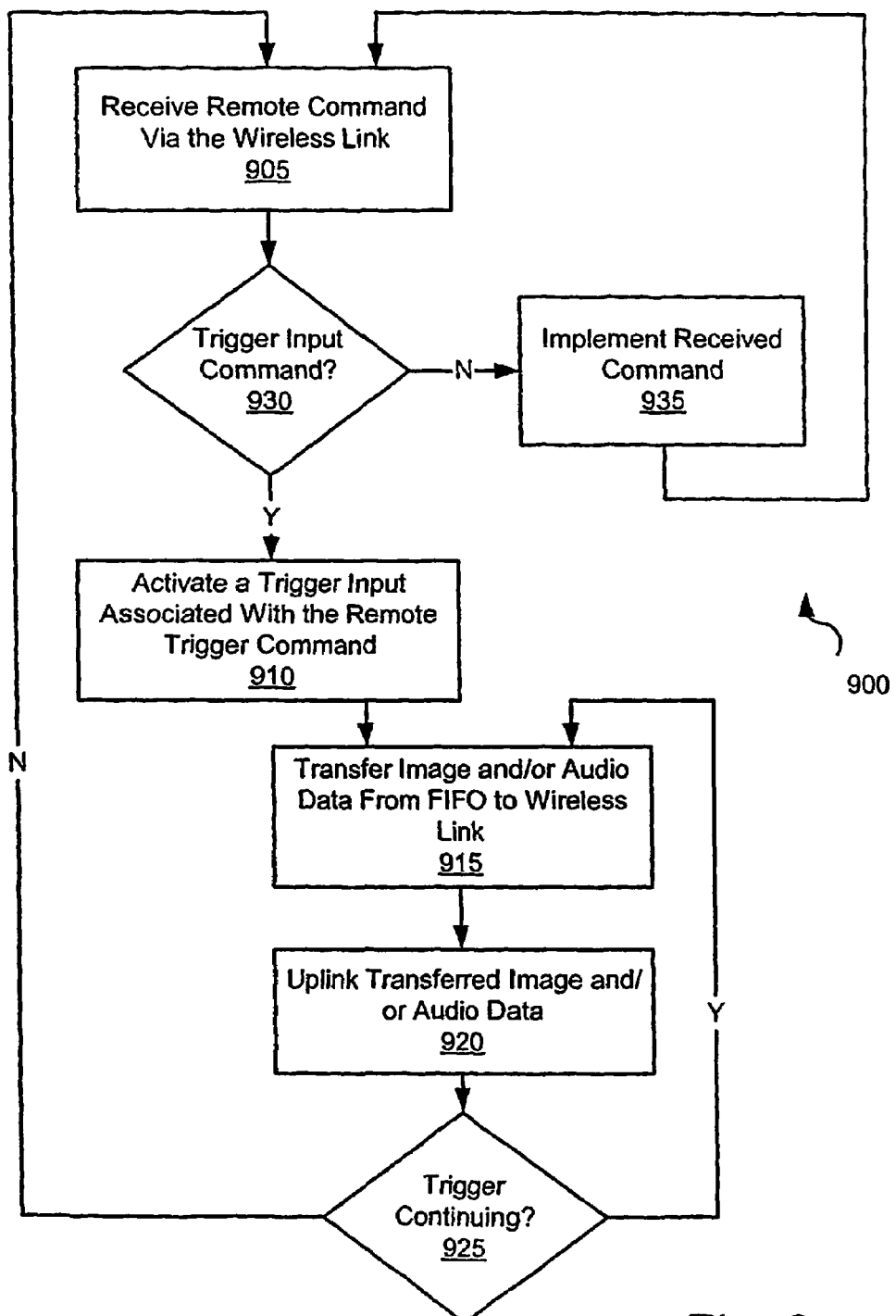
FIG. 9 depicts a flow diagram of a method in accordance with some embodiments of the present invention for remote triggering and wireless uplinking of sensor detected information.

Turning to FIG. 9, a flow diagram 900 illustrates a method in accordance with some embodiments of the present invention for remote triggering and wireless uplinking of sensor detected information. Such a method could be used, for example, to control remote monitoring of a teenage driver operating an automobile. In the method, a remote user pushes a button on a personal computer or other linked device causing a remote trigger command to be sent to a monitoring system installed in the automobile.

Following flow diagram 900, a command is received (block 905), and it is determined if it is a remote trigger command (block 930). If it is not a trigger input command (block 930), the command is further parsed and implemented (block 935). Thus, for example, if it is a command to update firmware on the system, the firmware is updated.

Alternatively, where it is an update trigger command (block 930), the triggered action is performed (in this case, uplinking data). The input trigger command can be, but is not limited to, a command for a certain period of image and/or audio data to be transferred from the monitoring system, a command for the transfer of image and/or audio data continuously until the command is revoked by a subsequent command (acting as an on/off switch), or the like. Based on the remote trigger command, a trigger input associated with the command is activated for a period indicated by the command (block 910). Upon activation of the trigger input, the monitoring system operates similar to that described in relation to FIG. 4 above, except that in place of transferring the data to a non-volatile memory, the data is transferred from the FIFO to the wireless link (block 915). The data transferred to the wireless link is uplinked via the wireless link (block 920) to a remote location. This uplinked information could include information in addition to (or in place) image and/or audio data such as, for example, battery status data, speed sensor data on a car, global positioning system (GPS) data, fuel status data, and/or the like. This remote location can be the location from which the original command was issued, or some other location. Thus, in some cases, a parent sitting at home can issue a command, and in return the parent is resented with image and/or audio data obtained from inside and/or outside an automobile that a child is operating.

It is also determined whether the trigger input is still active (block 925), and where it is active the data transfer continues (blocks 915, 920). It should be recognized that the remote command could trigger other actions. For example, it may be that, rather that uplinking the captured data, the audio and/or image data is captured to a non-volatile memory as discussed in relation to FIG. 4. As yet another alternative, the data may be both captured to a non-volatile memory, and uplinked. Based on the disclosure provided herein, one of ordinary skill in the art will recognize a number of other uses and/or applications of remote triggering of a monitoring device.

From the preceding discussion, one of ordinary skill in the art will appreciate a myriad of benefits that can be achieved through implementing one or more aspects of the present invention. Various embodiments of the present invention can include circuitry designed to achieve one or more of the previously discussed benefits, and/or other benefits described herein.

The invention has now been described in detail for purposes of clarity and understanding. However, it will be appreciated that certain changes and modifications may be practiced within the scope of the appended claims. As just one example, a number of power sources can be used including, for example, a solar power source. Further, image sensors and audio sensors can be oriented to capture information relevant to both the interior and exterior of a given mobile environment. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A system for monitoring a mobile environment over a period of time that the mobile environment is not receiving power, the system comprising:
    a sensor;
    a system controller, wherein the system controller is communicably coupled to the sensor, and wherein the system controller provides an information stream derived from the sensor;
    a trigger input;
    a receiving system, wherein the receiving system is operable to operate on the information stream upon activation of the trigger input; and
    a mode detection system, wherein the mode detection system is operable to select between at least a continuous mode, a low power mode and a standby mode, wherein the continuous mode includes a continuous capture of the information stream by the system controller, wherein the low power mode includes a limited capture of the information stream by the system controller, and wherein the standby mode includes a limited capture of the information stream by the system controller.

2. The system of claim 1, wherein the receiving system is selected from a group consisting of: a memory system and a wireless link system.

3. The system of claim 2, wherein the memory system includes a flash memory card.

4. The surveillance system of claim 2, wherein the trigger input includes a first trigger input and a second trigger input, wherein the memory system is operable to store the information stream upon activation of the first trigger input; and wherein the wireless communication link is operable to transmit the information stream upon activation of the second trigger input.

5. The system of claim 1, wherein the trigger input includes one or more triggers selected from a group consisting of: an alarm signal, a door lock signal, a door open signal, an acceleration signal, a panic signal, and a geographic boundary signal.

6. The system of claim 1, wherein the information stream includes one or more sets of data associated therewith, the one or more sets of data selected from the group consisting of: time stamp data, speed sensor data, fuel status data, global positioning system data, and battery status data.

7. A method for performing surveillance in a mobile environment, the method comprising:
    providing an image sensor;
    providing a tiered memory, wherein the tiered memory includes a first tier memory and a second tier memory;
    receiving an image signal from the image sensor;
    storing a derivative of the image signal to the first tier memory;
    receiving a trigger input;
    based at least in part upon the trigger input, storing the derivative of the image signal to the second tier memory;
    monitoring a power source, wherein a power source level is detected; and
    limiting storage of the derivative of the image signal to the first tier memory based on the power source level.

8. The method of claim 7, wherein the method further includes:
    charging a power supply maintained in association with the system.

9. The method of claim 7, the method further including:
    providing a wireless communication link; and
    based at least in part upon the trigger input, transmitting the derivative of the image signal via the wireless communication link.

10. The method of claim 7, the method further including:
    associating a time stamp with the derivative of the image signal stored in the second tier memory.

11. The method of claim 7, the method further comprising:
    providing an audio sensor;
    receiving an audio signal from the audio sensor;
    storing a derivative of the audio signal to the first tier memory; and
    based at least in part upon the trigger input, storing the derivative of the audio signal to the second tier memory.

12. A surveillance system associated with a mobile environment, the system comprising:
    a first image sensor, wherein the first image sensor is oriented to acquire a first image relative to the mobile environment;
    a second image sensor, wherein the second image sensor is oriented to acquire a second image relative to the mobile environment;
    a system controller, wherein the system controller is communicably coupled to the first image sensor and the second image sensor;
    a tiered memory system, wherein the tiered memory system includes a first tier memory and a second tier memory, wherein the tiered memory system is electrically coupled to the system controller, and wherein at least one of the first image and the second image is stored to the first tier memory;
    a trigger input, wherein upon activation of the trigger input at least one of the first image and the second image is stored to the second tier memory;
    monitoring a power source, wherein a power source level is detected; and
    limiting storage of at least one of the first image and the second image to the first tier memory based on the power source level.

13. The surveillance system of claim 12, wherein the first tier memory is a first in, first out memory.

14. The surveillance system of claim 13, wherein the first in, first out memory is a volatile memory.

15. The surveillance system of claim 12, wherein the second tier memory is a non-volatile memory.

16. The surveillance system of claim 12, wherein the second tier memory is a flash memory card.

17. A surveillance system for disposition in a mobile environment; the system comprising:
    an image sensor, wherein the image sensor provides an image output;
    a controller, wherein the controller is communicably coupled to the image sensor;
    a power sensing element, wherein the power sensing element determines a status of a power source;
    a trigger input communicably coupled to the controller; and
    a tiered memory, wherein the tiered memory includes a first tier memory and a second tier memory, and wherein a derivative of the image output is stored to the first tier memory based at least in part on the status of the power source, and wherein the derivative of the image output is stored to the second tier memory based at least in part on the trigger input.

18. A security system capable of monitoring a mobile environment over a period of time that the mobile environment is not receiving power, the system comprising:
- a sensor;
- a system controller, wherein the system controller is communicably coupled to the sensor, and wherein the system controller provides an information stream derived from the sensor;
- a trigger input;
- a memory system including a first tier memory and a second tier memory, wherein the second tier memory is operable to operate on the information stream upon activation of the trigger input;
- a mode detection system, wherein the mode detection system is operable to select between at least a continuous mode, a low power mode and a standby mode, wherein the continuous mode includes a continuous capture of the information stream by the first tier memory, the low power mode includes a limited capture of the information stream by the first tier memory, and wherein the standby mode includes a limited capture of the information stream by the first tier memory.

19. The system of claim 18, wherein the standby mode includes no capture of the information stream by the first tier memory.

20. The system of claim 18, wherein the memory system includes a flash memory.

21. The surveillance system of claim 18, further comprising a wireless communication link, wherein the trigger input includes a first trigger input and a second trigger input, wherein the memory system is operable to store the information stream upon activation of the first trigger input; and wherein the wireless communication link is operable to transmit the information stream upon activation of the second trigger input.

22. The system of claim 18, wherein the trigger input includes one or more triggers selected from a group consisting of: an alarm signal, a door lock signal, a door open signal, an acceleration signal, a panic signal, and a geographic boundary signal.

23. A system capable of monitoring a mobile environment, the system comprising:
- a sensor;
- a system controller, wherein the system controller is communicably coupled to the sensor, and wherein the system controller provides an information stream derived from the sensor;
- a trigger input;
- a receiving system, wherein the receiving system is operable to operate on the information stream upon activation of the trigger input;
- a mode detection system, wherein the mode detection system is operable to select between at least a continuous mode and a low power mode, wherein the continuous mode includes a continuous capture of the information stream by the system controller, and wherein the low power mode includes a limited capture of the information stream by the system controller.

24. The system of claim 23, wherein the receiving system is selected from a group consisting of a memory system and a wireless link system.

25. The system of claim 24, wherein the memory system includes a flash memory card.

26. The system of claim 24, wherein the trigger input includes a first trigger input and a second trigger input, wherein the memory system is operable to store the information stream upon activation of the first trigger input; and wherein the wireless communication link is operable to transmit the information stream upon activation of the second trigger input.

27. The system of claim 23, wherein the trigger input includes one or more triggers selected from a group consisting of: an alarm signal, a door lock signal, a door open signal, an acceleration signal, a panic signal, and a geographic boundary signal.

28. The system of claim 23, wherein the limited capture of the information stream is a capture of the information stream upon activation of the trigger input.

29. The system of claim 23, wherein the information stream includes one or more sets of data associated therewith, the one or more sets of data selected from the group consisting of: time stamp data, speed sensor data, fuel status data, global positioning system data, and battery status data.

30. A method for performing monitoring in a mobile environment, the method comprising:
- providing an image sensor;
- providing a memory;
- receiving an image signal from the image sensor;
- storing a derivative of the image signal to the memory;
- receiving a trigger input; and
- monitoring a power source, wherein a power source level is detected;
- wherein storing the derivative of the image signal to the memory is continuous when the power source level is an adequate power source level, and wherein storing the derivative of the image signal to the memory is responsive to the trigger input when the power source level is a low power source level.

31. The method of claim 30, wherein the method further includes:
- charging a power supply maintained in association with the system.

32. The method of claim 30, wherein the trigger input includes one or more triggers selected from a group consisting of: an alarm signal, a door lock signal, a door open signal, an acceleration signal, a panic signal, and a geographic boundary signal.

33. The method of claim 30, the method further including:
- providing a wireless communication link; and
- based at least in part upon the trigger input, transmitting the derivative of the image signal via the wireless communication link.

34. The method of claim 30, the method further including:
- associating a time stamp with the derivative of the image signal stored in the memory.

35. The method of claim 30, the method further comprising:
- providing an audio sensor;
- receiving an audio signal from the audio sensor; and
- storing a derivative of the audio signal to the memory based at least in part upon the trigger input and the power source level.

36. The method of claim 30, the method further including:
- associating one or more sets of data with the derivative of the image signal stored in the memory, the one or more sets of data selected from the group consisting of: speed sensor data, fuel status data, global positioning system data, and battery status data.

* * * * *